(12) United States Patent
Yoshiyasu

(10) Patent No.: US 11,602,954 B2
(45) Date of Patent: Mar. 14, 2023

(54) TIRE RUBBER COMPOSITION AND PNEUMATIC TIRE

(71) Applicant: SUMITOMO RUBBER INDUSTRIES, LTD., Hyogo (JP)

(72) Inventor: Hayato Yoshiyasu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 384 days.

(21) Appl. No.: 17/054,864

(22) PCT Filed: Apr. 16, 2019

(86) PCT No.: PCT/JP2019/016312
§ 371 (c)(1),
(2) Date: Nov. 12, 2020

(87) PCT Pub. No.: WO2019/220842
PCT Pub. Date: Nov. 21, 2019

(65) Prior Publication Data
US 2021/0229497 A1 Jul. 29, 2021

(30) Foreign Application Priority Data
May 15, 2018 (JP) .............................. JP2018-093842

(51) Int. Cl.
*B60C 1/00* (2006.01)
*C08L 9/06* (2006.01)
*C08K 3/36* (2006.01)
*C08K 5/17* (2006.01)
*C08K 3/04* (2006.01)

(52) U.S. Cl.
CPC ............. *B60C 1/0016* (2013.01); *C08K 3/04* (2013.01); *C08K 3/36* (2013.01); *C08K 5/17* (2013.01); *C08L 9/06* (2013.01)

(58) Field of Classification Search
CPC .... B60C 1/00; C08L 9/06; C08K 3/36; C08K 5/17; C08K 3/04
USPC ........................................................ 523/156
See application file for complete search history.

(56) References Cited

U.S. PATENT DOCUMENTS

| | | |
|---|---|---|
| 3,938,574 A | 2/1976 | Burmester et al. |
| 8,431,644 B2* | 4/2013 | Uesaka ..................... C08L 9/06 |
| | | 524/548 |
| 2008/0033082 A1 | 2/2008 | Hahn |
| 2010/0105826 A1* | 4/2010 | Uesaka ................. B60C 1/0016 |
| | | 524/548 |
| 2014/0041781 A1 | 2/2014 | Tomoi |
| 2015/0314644 A1 | 11/2015 | Grassi et al. |
| 2016/0096948 A1 | 4/2016 | Ono et al. |
| 2018/0030248 A1 | 2/2018 | Hatano et al. |
| 2019/0284364 A1 | 9/2019 | Ogi et al. |

FOREIGN PATENT DOCUMENTS

| | | |
|---|---|---|
| CN | 105482208 | 4/2016 |
| CN | 107207791 | 9/2017 |
| JP | 50-88150 | 7/1975 |
| JP | 2000-17107 | 1/2000 |
| JP | 2001131344 A * | 5/2001 |
| JP | 2007-269893 | 10/2007 |
| JP | 2011-052067 | 3/2011 |
| JP | 2012-052128 | 2/2013 |
| JP | 2013-133401 | 7/2013 |
| JP | 2014-516379 | 7/2014 |
| JP | 2015-086257 | 5/2015 |
| JP | 2017-088754 | 5/2017 |
| KR | 101354443 | 1/2014 |
| WO | 2013/094693 | 6/2013 |
| WO | 2017/199853 | 11/2017 |

OTHER PUBLICATIONS

ISR issued in WIPO Patent Application No. PCT/JP2019/016312, dated Jul. 9, 2019, English translation.
IPRP issued in WIPO Patent Application No. PCT/JP2019/016312, issued Nov. 17, 2020, English translation.

* cited by examiner

*Primary Examiner* — Deve V Hall
(74) *Attorney, Agent, or Firm* — Greenblum & Bernstein, P.L.C.

(57) ABSTRACT

Provided are a rubber composition for tires that provides improved silica dispersion and fuel economy while maintaining good hardness, and a pneumatic tire including the rubber composition. The present invention relates to a rubber composition for tires, containing a rubber component, silica, and a silica dispersing agent represented by the following formula (I).

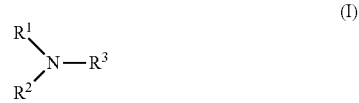

8 Claims, No Drawings

TIRE RUBBER COMPOSITION AND PNEUMATIC TIRE

TECHNICAL FIELD

The present invention relates to a rubber composition for tires, and a pneumatic tire including the rubber composition.

BACKGROUND ART

Fuel consumption of vehicles has conventionally been reduced by lowering the rolling resistance of their tires (or improving the rolling resistance properties thereof). In recent years, due to the ever-increasing demand for fuel efficient vehicles, it has become desirable for rubber compositions for producing treads, which occupy a large proportion of the tire volume, among other tire components, to have excellent low heat build-up properties (fuel economy).

A known technique to impart satisfactory low heat build-up properties to rubber compositions is reducing the amount of reinforcing fillers. However, this technique may disadvantageously lead to a reduction in the hardness of the rubber compositions and therefore to tire softening, resulting in a decrease in vehicle handling performance (handling stability).

Patent Literature 1 discloses that fuel economy may be improved by incorporating a polymer produced by polymerization of a silane coupling agent, but this technique still leaves room for improvement. Moreover, development of other techniques is awaited.

CITATION LIST

Patent Literature

Patent Literature 1: JP 2012-52128 A

SUMMARY OF INVENTION

Technical Problem

The present invention aims to solve the problems and provide a rubber composition for tires that provides improved silica dispersion and fuel economy while maintaining good hardness, and a pneumatic tire including the rubber composition.

Solution to Problem

The present inventor has conducted extensive studies and found that a specific compound may be incorporated to improve silica dispersion and fuel economy while maintaining good hardness. This finding has led to the completion of the present invention. Specifically, the present invention relates to a rubber composition for tires, containing: a rubber component; silica; and a silica dispersing agent represented by the following formula (I):

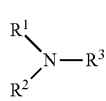

(I)

wherein $R^1$ represents a hydrocarbon group; and $R^2$ and $R^3$ are the same or different and each represent a hydrogen atom, a hydrocarbon group, or a $-(AO)_n-H$ group wherein n represents an integer, each n for $R^2$ and $R^3$ may be the same or different, and each AO is the same or different and represents an oxyalkylene group having 3 or more carbon atoms, and at least one of $R^2$ or $R^3$ is the $-(AO)_n-H$ group.

Preferably, the rubber component includes, based on 100% by mass thereof, 30 to 100% by mass of styrene-butadiene rubber.

Preferably, the rubber composition contains the silica dispersing agent in an amount of 0.1 to 10.0 parts by mass per 100 parts by mass of the rubber component.

Preferably, the rubber composition contains the silica in an amount of 20 to 140 parts by mass per 100 parts by mass of the rubber component.

Preferably, a combined amount of the silica and carbon black is 20 to 160 parts by mass per 100 parts by mass of the rubber component.

Preferably, the rubber composition for tires is for use as a rubber composition for treads.

The present invention also relates to a pneumatic tire, including a tire component formed from the rubber composition.

Preferably, the tire component is a tread.

Advantageous Effects of Invention

The rubber composition for tires of the present invention contains a rubber component, silica, and a silica dispersing agent of formula (I). Such a rubber composition provides improved silica dispersion and fuel economy while maintaining good hardness. Thus, by using the rubber composition in a tire component such as a tread, pneumatic tires excellent in the above-mentioned properties can be provided.

DESCRIPTION OF EMBODIMENTS

The rubber composition for tires of the present invention contains a rubber component, silica, and a silica dispersing agent of formula (I).

The reason why the rubber composition provides improved silica dispersion and fuel economy while maintaining good hardness is not exactly clear but may be explained as follows.

Inorganic fillers such as silica have high surface hydrophilicity and, unfortunately, disperse poorly in rubber. The present invention involves the incorporation of a silica dispersing agent specified herein together with silica to improve silica dispersion and fuel economy while maintaining good hardness. This is probably because of the structure of the silica dispersing agent specified herein which contains both a hydrocarbon group (i.e., a hydrophobic moiety) interactive with rubber and a $-(AO)_n-H$ group (i.e., a hydrophilic moiety) interactive with silica and thus improves silica dispersion. If the interaction with silica is too strong, the effect of improving silica dispersion will decrease. In the present invention, however, AO in the $-(AO)_n-H$ group has 3 or more carbon atoms; namely, the hydrophilic moiety is bulky and thus can moderately interact with silica. Thus, the silica dispersing agent is less likely to adsorb to silica and less likely to inhibit the reaction between silica and silane coupling agents. Probably for this reason, silica dispersion is further improved, and at the same time better fuel economy is provided.

Moreover, in the present invention, it is possible to maintain good hardness and thus to provide good vehicle handling performance (handling stability), wet grip performance, and abrasion resistance.

Examples of materials that can be used in the rubber component include natural rubber (NR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). The rubber component may consist of a single material or a combination of two or more materials. To more suitably achieve the advantageous effects, SBR and/or BR are/is preferred among these, with a combination of SBR and BR being more preferred.

Non-limiting examples of the SBR include emulsion-polymerized styrene-butadiene rubber (E-SBR) and solution-polymerized styrene-butadiene rubber (S-SBR). These may be used alone or in combinations of two or more.

The SBR preferably has a styrene content of 15% by mass or higher, more preferably 20% by mass or higher. The styrene content of the SBR is also preferably 50% by mass or lower. When the rubber composition contains a SBR having a styrene content within the range indicated above, the advantageous effects can be more suitably achieved.

The styrene content may be determined by $^1$H-NMR.

The SBR may be a product manufactured or sold by, for example, JSR Corporation, Sumitomo Chemical Co., Ltd., Asahi Kasei Chemicals Corporation, Zeon Corporation, Lanxess, or Trinseo.

In the case of the rubber composition containing SBR, the amount of the SBR based on 100% by mass of the rubber component is preferably 30% by mass or more, more preferably 40% by mass or more, still more preferably 60% by mass or more. The amount of the SBR may be 100% by mass and is preferably 95% by mass or less, more preferably 90% by mass or less. When the amount of the SBR is within the range indicated above, the advantageous effects can be more suitably achieved.

Non-limiting examples of the BR include high-cis BR such as BR1220 available from Zeon Corporation, BR130B and BR150B both available from Ube Industries, Ltd., and BR730 available from JSR Corporation, and BR containing syndiotactic polybutadiene crystals such as VCR412 and VCR617 both available from Ube Industries, Ltd. These may be used alone or in combinations of two or more. In particular, the BR preferably has a cis content of 90% by mass or higher to more suitably achieve the advantageous effects.

Herein, the cis content of the rubber component may be measured by infrared absorption spectrometry.

In the case of the rubber composition containing BR, the amount of the BR based on 100% by mass of the rubber component is preferably 5% by mass or more, more preferably 10% by mass or more. The amount of the BR is preferably 60% by mass or less, more preferably 40% by mass or less, still more preferably 30% by mass or less. When the amount of the BR is within the range indicated above, the advantageous effects can be more suitably achieved.

The combined amount of the SBR and BR based on 100% by mass of the rubber component is preferably 60% by mass or more, more preferably 80% by mass or more, and may be 100% by mass. When the combined amount of the SBR and BR is within the range indicated above, the advantageous effects can be more suitably achieved.

The present invention involves the use of a silica dispersing agent represented by the formula (I) below. By incorporating the silica dispersing agent specified herein together with silica, it is possible to improve silica dispersion and fuel economy while maintaining good hardness. The silica dispersing agent may consist of a single material or a combination of two or more materials.

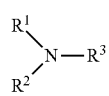

(I)

In formula (I), $R^1$ represents a hydrocarbon group; and $R^2$ and $R^3$ are the same or different and each represent a hydrogen atom (—H), a hydrocarbon group, or a -(AO)$_n$—H group wherein n represents an integer, each n for $R^2$ and $R^3$ may be the same or different, and each AO is the same or different and represents an oxyalkylene group having 3 or more carbon atoms, and at least one of $R^2$ or $R^3$ is the -(AO)$_n$—H group.

The hydrocarbon groups for $R^1$ to $R^3$ may be linear, branched, or cyclic, and examples include aliphatic hydrocarbon groups, alicyclic hydrocarbon groups, and aromatic hydrocarbon groups, with aliphatic hydrocarbon groups being preferred among these. The carbon number of the hydrocarbon groups is preferably 1 or more, more preferably 5 or more, still more preferably 8 or more, particularly preferably 12 or more, but is preferably 30 or less, more preferably 25 or less, still more preferably 22 or less, particularly preferably 20 or less. When the carbon number is within the range indicated above, the advantageous effects tend to be more suitably achieved.

Examples of the aliphatic hydrocarbon groups include alkyl, alkylene, alkenyl, alkenylene, alkynyl, and alkynylene groups. Among these, alkyl groups having the above-mentioned carbon number range are preferred. Examples of the alkyl groups include methyl, ethyl, n-propyl, isopropyl, n-butyl, isobutyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

Preferred examples of the alicyclic hydrocarbon groups include C3-C8 alicyclic hydrocarbon groups. Specific examples include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

Preferred examples of the aromatic hydrocarbon groups include C6-C10 aromatic hydrocarbon groups. Specific examples include phenyl, benzyl, phenethyl, tolyl, xylyl, and naphthyl groups. The tolyl or xylyl group may have a methyl substituent(s) at any of the ortho, meta, and para positions of the benzene ring.

Each AO in the -(AO)$_n$—H group (wherein n represents an integer and each n for $R^2$ and $R^3$ may be the same or different) for $R^2$ and $R^3$ is the same or different and represents an oxyalkylene group having 3 or more carbon atoms. The carbon number is preferably 4 or more. The upper limit is not limited but is preferably 7 or less, more preferably 6 or less, still more preferably 5 or less. When the carbon number is within the range indicated above, the advantageous effects tend to be more suitably achieved.

The alkylene group A in the oxyalkylene group AO may be either linear or branched. It is preferably branched to form a bulkier structure to more suitably achieve the advantageous effects.

To more suitably achieve the advantageous effects, AO is preferably a group in which a branched chain $R^4$ (wherein $R^4$ represents a hydrocarbon group) is bonded to a C2-C3 oxyalkylene group (an oxyethylene group (EO), an oxypropylene group (PO)). The $-(AO)_n$—H group is more preferably a group represented by the formula (A) or (B) below, still more preferably by the formula (A) below. The branched chain $R^4$ is preferably bonded to a carbon atom adjacent to an oxygen atom.

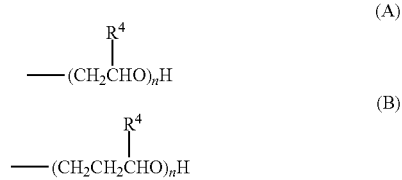

In formulas (A) and (B), $R^4$ represents a hydrocarbon group, and n is as defined for the $-(AO)_n$—H group.

Examples of the hydrocarbon group as $R^4$ include hydrocarbon groups as described for $R^1$ to $R^3$. Among these, aliphatic hydrocarbon groups are preferred, with alkyl groups being more preferred. The carbon number of the hydrocarbon group, preferably aliphatic hydrocarbon group, more preferably alkyl group, is preferably 1 or more, more preferably 2 or more, but is preferably 6 or less, more preferably 5 or less, still more preferably 4 or less, particularly preferably 3 or less. When the carbon number is within the range indicated above, the advantageous effects tend to be more suitably achieved.

When $(AO)_n$ includes two or more types of oxyalkylene groups, the oxyalkylene groups may be arranged blockwise or randomly.

The symbol n represents the number of moles of AO added and is preferably 1 or larger, more preferably 2 or larger, but is preferably 20 or smaller, more preferably 16 or smaller, still more preferably 10 or smaller, particularly preferably 5 or smaller, most preferably 3 or smaller. When the number is within the range indicated above, the advantageous effects tend to be more suitably achieved.

In formula (I), at least one of $R^2$ and $R^3$ groups is the $-(AO)_n$—H group. More preferably, $R^2$ and $R^3$ are all the $-(AO)_n$—H groups. In other words, the compound of formula (I) is still more preferably a compound represented by the following formula (I-1). In this case, the advantageous effects tend to be more suitably achieved.

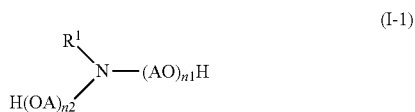

The symbols in formula (I-1) are as defined in formula (I), except that n1 and n2 each represent an integer (as defined for n).

In formula (I) and formula (I-1), the total number of moles of AO added (n1+n2) is preferably 1 or larger, more preferably 2 or larger, still more preferably 3 or lager, particularly preferably 4 or larger, but is preferably 40 or smaller, more preferably 32 or smaller, still more preferably 20 or smaller, particularly preferably 10 or smaller, most preferably 6 or smaller. When the total number is within the range indicated above, the advantageous effects tend to be more suitably achieved.

Specific examples of the silica dispersing agent include LIPONOL series available from Lion Specialty Chemicals Co., Ltd., such as LIPONOL HT/B12 (formula (I) wherein $R^1$=C14-C18 alkyl group, and $R^2$, $R^3$=—$CH_2CH(CH_2CH_3)$O—H group (a compound represented by the formula (C1) below wherein n=1, total number of moles of AO added: 2, formula (I-1) wherein n1=1 and n2=1)); LIPONOL HT/B14 (formula (I) wherein $R^1$=C14-C18 alkyl group, and $R^2$, $R^3$=—$(CH_2CH(CH_2CH_3)O)_2$—H group (a compound of formula (C1) wherein n=2, total number of moles of AO added: 4, formula (I-1) wherein n1=2 and n2=2)); LIPONOL HT/P12 (formula (I) wherein $R^1$=C14-C18 alkyl group, and $R^2$, $R^3$=—$CH_2CH(CH_3)$O—H group (a compound represented by the formula (C2) below wherein n=1, total number of moles of AO added: 2, formula (I-1) wherein n1=1 and n2=1)); LIPONOL HT/P14 (formula (I) wherein $R^1$=C14-C18 alkyl group, and $R^2$, $R^3$=—$(CH_2CH(OH_3)O)_2$—H group (a compound of formula (C2) wherein n=2, total number of moles of AO added: 4, formula (I-1) wherein n1=2 and n2=2)); LIPONOL HT/P16 (formula (I) wherein $R^1$=C14-C18 alkyl group, and $R^2$, $R^3$=—$(CH_2CH(CH_3)O)_3$—H group (a compound of formula (C2) wherein n=3, total number of moles of AO added: 6, formula (I-1) wherein n1=3 and n2=3)); LIPONOL HT/P20 (formula (I) wherein $R^1$=C14-C18 alkyl group, and $R^2$, $R^3$=a group of formula (C2), total number of moles of AO added: 10, formula (I-1) wherein n1+n2=10)); LIPONOL C/B14 (formula (I) wherein $R^1$=C8-C18 alkyl group, and $R^2$, $R^3$=—$(CH_2CH(CH_2CH_3)O)_2$—H group (a compound of formula (C1) wherein n=2, total number of moles of AO added: 4, formula (I-1) wherein n1=2 and n2=2)); LIPONOL C/P14 (formula (I) wherein $R^1$=C8-C18 alkyl group, and $R^2$, $R^3$=—$(CH_2CH(CH_3)O)_2$—H group (a compound of formula (C2) wherein n=2, total number of moles of AO added: 4, formula (I-1) wherein n1=2 and n2=2)); LIPONOL T/B14 (formula (I) wherein $R^1$ includes a C14-C18 alkyl group and a C18 alkenyl group, and $R^2$, $R^3$=—$(CH_2CH(CH_2CH_3)O)_2$—H group (a compound of formula (C1) wherein n=2, total number of moles of AO added: 4, formula (I-1) wherein n1=2 and n2=2)); and LIPONOL T/P14 (formula (I) wherein $R^1$ includes a C14-C18 alkyl group and a C18 alkenyl group, and $R^2$, $R^3$=—$(CH_2CH(CH_3)O)_2$—H group (a compound of formula (C2) wherein n=2, total number of moles of AO added: 4, formula (I-1) wherein n1=2 and n2=2)). These may be used alone or in combinations of two or more.

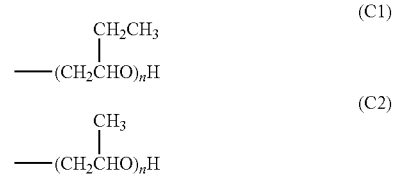

In formulas (C1) and (C2), n is as defined for the $-(AO)_n$—H group.

The silica dispersing agent may be any of the commercial products listed above, or alternatively may be produced, for example, but not limited to, by reacting an alkylene oxide with a multivalent amine compound in the presence or absence of a catalyst.

The amount of the silica dispersing agent (when combining two or more silica dispersing agents, the total amount thereof) is preferably 0.1 parts by mass or more, more preferably 0.5 parts by mass or more, still more preferably 1.0 part by mass or more, particularly preferably 2.0 parts by mass or more per 100 parts by mass of the rubber component. The amount is also preferably 10.0 parts by mass or less, more preferably 8.0 parts by mass or less, still more preferably 6.0 parts by mass or less per 100 parts by mass of the rubber component. When the amount of the silica dispersing agent is within the range indicated above, the advantageous effects can be more suitably achieved.

The present invention involves the use of silica. By incorporating the silica dispersing agent specified herein together with silica, it is possible to improve silica dispersion and fuel economy while maintaining good hardness. Non-limiting examples of the silica include dry silica (anhydrous silica) and wet silica (hydrous silica). Wet silica is preferred because it contains a large number of silanol groups. These may be used alone or in combinations of two or more.

The silica preferably has a nitrogen adsorption specific surface area ($N_2SA$) of 40 $m^2$/g or more, more preferably 50 $m^2$/g or more, still more preferably 100 $m^2$/g or more, particularly preferably 150 $m^2$/g or more. A $N_2SA$ of 40 $m^2$/g or more tends to lead to good hardness. The $N_2SA$ of the silica is also preferably 250 $m^2$/g or less, more preferably 220 $m^2$/g or less, still more preferably 200 $m^2$/g or less. A $N_2SA$ of 250 $m^2$/g or less tends to lead to good fuel economy and good processability. The nitrogen adsorption specific surface area of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the rubber component is preferably 20 parts by mass or more, more preferably 40 parts by mass or more, still more preferably 60 parts by mass or more, particularly preferably 70 parts by mass or more. When the amount is 20 parts by mass or more, the addition of silica tends to have sufficient effects (good hardness and improved fuel economy). The amount of the silica is preferably 140 parts by mass or less, more preferably 120 parts by mass or less, still more preferably 100 parts by mass or less. When the amount is 140 parts by mass or less, the silica tends to disperse better in rubber, thereby resulting in good fuel economy and good rubber processability.

The rubber composition preferably includes a silane coupling agent together with the silica. Examples of the silane coupling agent include sulfide silane coupling agents, mercapto silane coupling agents, vinyl silane coupling agents, amino silane coupling agents, glycidoxy silane coupling agents, nitro silane coupling agents, and chloro silane coupling agents. These may be used alone or in combinations of two or more. To more suitably achieve the advantageous effects, sulfide silane coupling agents are preferred among these.

From the standpoint of more suitably achieving the advantageous effects, preferred sulfide silane coupling agents are bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide, with bis(3-triethoxysilylpropyl)disulfide being more preferred.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

In the case of the rubber composition containing a silane coupling agent, the amount of the silane coupling agent per 100 parts by mass of the silica is preferably 1 part by mass or more, more preferably 3 parts by mass or more. The amount of the silane coupling agent is also preferably 20 parts by mass or less, more preferably 12 parts by mass or less. When the amount of the silane coupling agent is within the range indicated above, the silica will disperse better, so that the advantageous effects can be more suitably achieved.

The rubber composition preferably contains carbon black. This provides good reinforcement and good hardness.

Non-limiting examples of the carbon black include N134, N110, N220, N234, N219, N339, N330, N326, N351, N550, and N762. These may be used alone or in combinations of two or more.

The carbon black preferably has a nitrogen adsorption specific surface area ($N_2SA$) of 30 $m^2$/g or more, more preferably 60 $m^2$/g or more. A $N_2SA$ of 30 $m^2$/g or more tends to lead to sufficient reinforcement and good hardness. The $N_2SA$ of the carbon black is also preferably 250 $m^2$/g or less, more preferably 150 $m^2$/g or less, still more preferably 100 $m^2$/g or less. A $N_2SA$ of 250 $m^2$/g or less tends to lead to good processability and good fuel economy.

The nitrogen adsorption specific surface area of the carbon black is measured in accordance with JIS K6217-2:2001.

The carbon black preferably has a dibutyl phthalate (DBP) oil absorption of 70 ml/100 g or more, more preferably 90 ml/100 g or more. The DBP oil absorption of the carbon black is also preferably 160 ml/100 g or less, more preferably 120 ml/100 g or less. When the DBP oil absorption is within the range indicated above, the advantageous effects can be more suitably achieved.

The DBP oil absorption of the carbon black is measured in accordance with JIS K6217-4:2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

In the case of the rubber composition containing carbon black, the amount of the carbon black per 100 parts by mass of the rubber component is preferably 1 part by mass or more, more preferably 3 parts by mass or more. The amount of the carbon black is also preferably 50 parts by mass or less, more preferably 20 parts by mass or less, still more preferably 10 parts by mass or less. When the amount of the carbon black is within the range indicated above, the advantageous effects can be more suitably achieved.

The combined amount of the silica and carbon black per 100 parts by mass of the rubber component is preferably 20 parts by mass or more, more preferably 50 parts by mass or more, still more preferably 70 parts by mass or more. The combined amount is also preferably 160 parts by mass or less, more preferably 140 parts by mass or less, still more preferably 120 parts by mass or less, particularly preferably 110 parts by mass or less. When the combined amount of the silica and carbon black is within the range indicated above, the advantageous effects can be more suitably achieved.

The rubber composition preferably contains a vulcanization accelerator.

Examples of the vulcanization accelerator include: thiazole vulcanization accelerators such as 2-mercaptobenzothiazole (MBT) and dibenzothiazyl disulfide (MBTS); thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-tert-butyl-2-benzothiazolyl sulfonamide (TBBS), N-cyclohexyl-2-benzothiazolyl sulfenamide (CBS), N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as 1,3-diphenylguanidine (DPG), diorthotolylguanidine, and orthotolylbiguanidine. These may be used alone or in combinations of two or more. To more suitably achieve the advantageous effects, sulfenamide vulcanization accelerators are preferred among these. More preferred are combinations of sulfonamide vulcanization accelerators and guanidine vulcanization accelerators.

A preferred sulfenamide vulcanization accelerator is CBS. CBS is more preferably combined with N,N'-diphenylguanidine.

The vulcanization accelerator may be a commercial product of, for example, Sumitomo Chemical Co., Ltd. or Ouchi Shinko Chemical Industrial Co., Ltd.

In the case of the rubber composition containing a vulcanization accelerator, the amount of the vulcanization accelerator per 100 parts by mass of the rubber component is preferably 1 part by mass or more, more preferably 2 parts by mass or more. The amount of the vulcanization accelerator is also preferably 10 parts by mass or less, more preferably 5 parts by mass or less. When the amount of the vulcanization accelerator is within the range indicated above, the advantageous effects can be more suitably achieved.

The rubber composition may contain an oil.

Examples of the oil include process oils, vegetable fats and oils, and mixtures thereof. Examples of the process oils include paraffinic process oils, aromatic process oils, and naphthenic process oils. Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. Among these, paraffinic process oils are preferred.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

In the case of the rubber composition containing an oil, the amount of the oil per 100 parts by mass of the rubber component is preferably 5 parts by mass or more, more preferably 10 parts by mass or more, still more preferably 20 parts by mass or more. The amount is also preferably 70 parts by mass or less, more preferably 50 parts by mass or less, still more preferably 30 parts by mass or less. When the amount is within the range indicated above, the advantageous effects tend to be more suitably achieved.

The amount of the oil includes the amount of the oil, if present in the rubber (oil extended rubber).

The rubber composition preferably contains sulfur.

Examples of the sulfur include those usually used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

In the case of the rubber composition containing sulfur, the amount of the sulfur per 100 parts by mass of the rubber component is preferably 0.5 parts by mass or more, more preferably 1 part by mass or more. The amount is also preferably 10 parts by mass or less, more preferably 5 parts by mass or less, still more preferably 3 parts by mass or less.

When the amount is within the range indicated above, the advantageous effects tend to be more suitably achieved.

The rubber composition may contain a resin. Any resin generally used in the tire industry may be used, and examples include rosin-based resins, coumarone indene resins, α-methylstyrene-based resins, terpenic resins, p-t-buthylphenol acetylene resins, acrylic resins, C5 resins, and C9 resins. Examples of commercially available resins include products of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., and Toagosei Co., Ltd. These resins may be used alone or in combinations of two or more.

In the case of the rubber composition containing a resin, the amount of the resin per 100 parts by mass of the rubber component is preferably 0.3 parts by mass or more, more preferably 0.5 parts by mass or more, but is preferably 100 parts by mass or less, more preferably 50 parts by mass or less.

The rubber composition may contain an antioxidant.

Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. These may be used alone or in combinations of two or more. Among these, p-phenylenediamine antioxidants or quinoline antioxidants are preferred, with p-phenylenediamine antioxidants being more preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

In the case of the rubber composition containing an antioxidant, the amount of the antioxidant per 100 parts by mass of the rubber component is preferably 0.5 parts by mass or more, more preferably 1 part by mass or more. The amount is also preferably 10 parts by mass or less, more preferably 5 parts by mass or less. When the amount is within the range indicated above, the advantageous effects tend to be more suitably achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

In the case of the rubber composition containing a wax, the amount of the wax per 100 parts by mass of the rubber component is preferably 0.3 parts by mass or more, more preferably 0.5 parts by mass or more, but is preferably 20 parts by mass or less, more preferably 10 parts by mass or less. When the amount is within the range indicated above, the advantageous effects tend to be more suitably achieved.

The rubber composition preferably contains a fatty acid.

Examples of the fatty acid include conventional ones such as stearic acid, oleic acid, and palmitic acid. Stearic acid is preferred because the advantageous effects tend to be more suitably achieved. These may be used alone or in combinations of two or more.

The fatty acid may be a commercial product of, for example, NOF Corporation, Kao Corporation, FUJIFILM Wako Pure Chemical Corporation, or Chiba Fatty Acid Co., Ltd.

In the case of the rubber composition containing a fatty acid, the amount of the fatty acid per 100 parts by mass of the rubber component is preferably 0.5 parts by mass or more, more preferably 1 part by mass or more. The amount is also preferably 10 parts by mass or less, more preferably 5 parts by mass or less. When the amount is within the range indicated above, the advantageous effects tend to be more suitably achieved.

The rubber composition preferably contains zinc oxide. The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

In the case of the rubber composition containing zinc oxide, the amount of the zinc oxide per 100 parts by mass of the rubber component is preferably 0.5 parts by mass or more, more preferably 1 part by mass or more. The amount is also preferably 10 parts by mass or less, more preferably 5 parts by mass or less. When the amount is within the range indicated above, the advantageous effects tend to be more suitably achieved.

In addition to the above-mentioned components, the rubber composition may contain additives usually used in the tire industry, including, for example, organic peroxides and fillers such as magnesium sulphate. The amount of each filler per 100 parts by mass of the rubber component is preferably 0.1 parts by mass or more, but is preferably 200 parts by mass or less.

The rubber composition may be prepared, for example, by kneading the components using a rubber kneading machine such as an open roll mill or a Banbury mixer, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 80 to 110° C. The composition obtained after kneading vulcanizing agents and vulcanization accelerators is usually vulcanized by, for example, press vulcanization. The vulcanization temperature is usually 140 to 190° C., preferably 150 to 185° C.

The rubber composition, owing to its good fuel economy, may be used in tire components such as treads (cap treads), sidewalls, base treads, undertreads, clinches, bead apexes, breaker cushion rubbers, rubbers for carcass cord topping, insulations, chafers, and innerliners, as well as side reinforcement layers of run-flat tires. Among these, the rubber composition is suitable for treads.

The pneumatic tire of the present invention may be prepared using the rubber composition by usual methods. Specifically, the unvulcanized rubber composition containing additives as needed may be extruded into the shape of a tire component (in particular, a tread (cap tread)), formed on a tire building machine in a usual manner, and assembled with other tire components to build an unvulcanized tire, which may then be heated and pressurized in a vulcanizer to produce a tire.

The pneumatic tire can be suitably used as, for example, a tire for passenger vehicles, large passenger vehicles, large SUVs, trucks and buses, or two-wheeled vehicles, or as a racing tire, a studless winter tire (winter tire), a run-flat tire, an aircraft tire, or a mining tire, particularly suitably as a tire for passenger vehicles.

EXAMPLES

The present invention is specifically described with reference to, but not limited to, examples.

The chemicals used in the examples and comparative example are listed below.

SBR: a commercial product available from Zeon Corporation (S-SBR, styrene content: 41% by mass)

BR: a commercial product available from JSR Corporation (cis content: 95% by mass)

Carbon black: SHOBLACK N330 available from Cabot Japan K.K. ($N_2SA$: 75 $m^2/g$, DBP oil absorption: 102 ml/100 g)

Silica: ULTRASIL VN3 available from Evonik Degussa ($N_2SA$: 175 $m^2/g$)

Silane coupling agent: Si266 available from Evonik Degussa (bis(3-triethoxysilylpropyl)disulfide)

Compound 1: LIPONOL HT/B14 (a compound of formula (I) (formula (I-1)) available from Lion Specialty Chemicals Co., Ltd.

Compound 2: LIPONOL HT/P14 (a compound of formula (I) (formula (I-1)) available from Lion Specialty Chemicals Co., Ltd.

Compound 3: LIPONOL C/B14 (a compound of formula (I) (formula (I-1)) available from Lion Specialty Chemicals Co., Ltd.

Wax: Ozoace wax available from Nippon Seiro Co., Ltd.

Oil: Process oil PW-32 (paraffinic process oil) available from Idemitsu Kosan Co., Ltd.

Antioxidant: NOCRAC 6C (N-(1,3-dimethylbutyl)-N'-phenyl-p-phenylenediamine) available from Ouchi Shinko Chemical Industrial Co., Ltd.

Stearic acid: stearic acid available from NOF Corporation

Sulfur: powdered sulfur available from Tsurumi Chemical Industry Co., Ltd.

Zinc oxide: Zinc oxide #1 available from Mitsui Mining & Smelting Co., Ltd.

Vulcanization accelerator 1: NOCCELER CZ (N-cyclohexyl-2-benzothiazolylsulfenamide) available from Ouchi Shinko Chemical Industrial Co., Ltd.

Vulcanization accelerator 2: NOCCELER D (N,N'-diphenylguanidine) available from Ouchi Shinko Chemical Industrial Co., Ltd.

Examples and Comparative Example

According to each of the formulations shown in Table 1, the chemicals other than the sulfur and vulcanization accelerators were kneaded in a Banbury mixer at 165° C. for four minutes to give a kneaded mixture. Next, the kneaded mixture was kneaded with the sulfur and vulcanization accelerators at 80° C. for four minutes using an open roll mill to obtain an unvulcanized rubber composition. Then, the unvulcanized rubber composition was press-vulcanized at 170° C. for 20 minutes to obtain a vulcanized rubber composition.

The vulcanized rubber compositions prepared as above were evaluated as described below. Table 1 shows the results. It should be noted that Comparative Example 1 is used as a standard of comparison in Table 1.

(Silica Dispersion Index)

The G* at strains of 0.5, 1, 2, 4, 8, 16, 32, and 64% of the vulcanized rubber compositions was measured at 100° C. and 1 Hz using a RPA2000 tester available from Alpha Technologies. A difference between the maximum and minimum values of G* was calculated to determine the Payne effect of the silica. The results are expressed as an index, with the standard comparative example set equal to 100. This index is indicative of silica dispersion. A higher index means that the silica is better dispersed, indicating better silica dispersion.

(Fuel Economy)

The tan δ of the vulcanized rubber compositions was measured at a dynamic strain amplitude of 1%, a frequency of 10 Hz, and a temperature of 50° C. using a spectrometer available from Ueshima Seisakusho Co., Ltd. The tan δ values are expressed as an index, with the standard comparative example set equal to 100. A higher index indicates a smaller rolling resistance and thus better fuel economy.

(Hardness)

The hardness of the vulcanized rubber compositions was measured using a type A durometer in accordance with JIS K6253 "Rubber, vulcanized or thermoplastic—Determination of hardness". The measurement was carried out at 25° C. The results are expressed as an index, with the standard comparative example set equal to 100. A higher index indicates better hardness resulting in better vehicle handling performance (handling stability), wet grip performance, and abrasion resistance. An index of 85 or higher is considered good.

The invention claimed is:

1. A rubber composition for tires, comprising:
   a rubber component;
   silica; and
   a silica dispersing agent represented by the following formula (I):

wherein $R^1$ represents a hydrocarbon group; and $R^2$ and $R^3$ are the same or different and each represent a hydrogen atom, a hydrocarbon group, or a $-(AO)_n-H$ group wherein n represents an integer of 1 or larger, each n for $R^2$ and $R^3$ may be the same or different, and each AO is the same or different and represents an oxyalkylene group having 3 or more carbon atoms, and at least one of $R^2$ or $R^3$ is the $-(AO)_n-H$ group.

2. The rubber composition for tires according to claim 1, wherein the rubber component comprises, based on 100% by mass thereof, 30 to 100% by mass of styrene-butadiene rubber.

3. The rubber composition for tires according to claim 1, wherein the rubber composition comprises the silica dispersing agent in an amount of 0.1 to 10.0 parts by mass per 100 parts by mass of the rubber component.

4. The rubber composition for tires according to claim 1, wherein the rubber composition comprises the silica in an amount of 20 to 140 parts by mass per 100 parts by mass of the rubber component.

5. The rubber composition for tires according to claim 1, wherein a combined amount of the silica and carbon black is 20 to 160 parts by mass per 100 parts by mass of the rubber component.

TABLE 1

|  |  | Comparative Example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Amount (parts by mass) | SBR | 80 | 80 | 80 | 80 | 80 | 80 | 80 | 80 | 60 | 100 | 80 |
|  | BR | 20 | 20 | 20 | 20 | 20 | 20 | 20 | 20 | 40 | — | 20 |
|  | Carbon black | 5 | 5 | 5 | 5 | 5 | 5 | 5 | 5 | 5 | 5 | 10 |
|  | Silica | 95 | 95 | 95 | 95 | 95 | 95 | 60 | 120 | 95 | 95 | 95 |
|  | Silane coupling agent | 7.6 | 7.6 | 7.6 | 7.6 | 7.6 | 7.6 | 4.8 | 9.6 | 7.6 | 7.6 | 7.6 |
|  | Compound 1 | — | 4 | — | — | 1.5 | 7 | 4 | 4 | 4 | 4 | 4 |
|  | Compound 2 | — | — | 4 | — | — | — | — | — | — | — | — |
|  | Compound 3 | — | — | — | 4 | — | — | — | — | — | — | — |
|  | Wax | 2 | 2 | 2 | 2 | 2 | 2 | 2 | 2 | 2 | 2 | 2 |
|  | Oil | 25 | 25 | 25 | 25 | 25 | 25 | 25 | 25 | 25 | 25 | 25 |
|  | Antioxidant | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 | 1.5 | 1.5 | 1.5 |
|  | Zinc oxide | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 |
|  | Vulcanization accelerator 2 | 2 | 2 | 2 | 2 | 2 | 2 | 2 | 2 | 2 | 2 | 2 |
| Evaluation result | Silica dispersion index | 100 | 115 | 120 | 114 | 105 | 112 | 110 | 106 | 112 | 113 | 111 |
|  | Fuel economy | 100 | 111 | 106 | 110 | 103 | 109 | 115 | 104 | 109 | 105 | 106 |
|  | Hardness | 100 | 100 | 100 | 100 | 100 | 97 | 86 | 111 | 91 | 102 | 103 |

As shown in Table 1, the examples containing a rubber component, silica, and a silica dispersing agent of formula (I) exhibited improved silica dispersion and fuel economy while maintaining good hardness.

6. The rubber composition for tires according to claim 1, which is for use as a rubber composition for treads.

7. A pneumatic tire, comprising a tire component formed from the rubber composition according to claim 1.

8. The pneumatic tire according to claim 7, wherein the tire component is a tread.

\* \* \* \* \*